United States Patent [19] [11] 4,333,843
Wing et al. [45] Jun. 8, 1982

[54] GLYCOL COMPOSITIONS CONTAINING A HYDROLYZATE OF AN ORGANO PHOSPHORUS-SILICON COMPOUND

[75] Inventors: Phillip L. Wing, Lake Jackson, Tex.; George A. Sweeney, Midland, Mich.

[73] Assignee: The Dow Chemical Company, Midland, Mich.

[21] Appl. No.: 198,973

[22] Filed: Oct. 20, 1980

Related U.S. Application Data

[63] Continuation-in-part of Ser. No. 153,464, May 27, 1980, abandoned, which is a continuation-in-part of Ser. No. 59,412, Jul. 20, 1979, abandoned, which is a continuation-in-part of Ser. No. 939,100, Sep. 1, 1978, abandoned.

[51] Int. Cl.³ ............................................. C09K 5/00
[52] U.S. Cl. ....................................... 252/75; 252/74; 252/78.3
[58] Field of Search .......................... 252/75, 74, 78.3

[56] References Cited

U.S. PATENT DOCUMENTS 3,312,622  4/1967  Pines .................................. 252/75
3,362,910  1/1968  Ordelt et al. ....................... 252/75
4,093,641  6/1978  Plueddemann ..................... 556/405
4,149,985  4/1979  Wilson ................................ 252/74

FOREIGN PATENT DOCUMENTS 2018266  10/1979  United Kingdom .

Primary Examiner—P. E. Willis, Jr.
Attorney, Agent, or Firm—B. G. Colley

[57] ABSTRACT

Gellation resistant aqueous glycol compositions useful as antifreeze compositions are disclosed containing silicates together with other corrosion inhibitors. The silicates are added to the glycol compositions after the other additives have been added and after the composition has been adjusted to a pH range of 7–12. The gellation resistance is obtained or enhanced by the addition of an effective amount of the hydrolyzate of organophosphorous-silicon compounds having the formula $(RO)_3Si(CH_2)_n-O-P(O)(CH_3)-OR$ wherein R is an alkyl group of 1–4 carbon atoms, and n is an integer of 1–4, A method of improving the gellation resistance of aqueous glycol compositions is also disclosed which comprises adding an effective amount of the above hydrolyzate to the corrosion resistant glycol compositions before or during the silicate addition.

18 Claims, No Drawings

GLYCOL COMPOSITIONS CONTAINING A HYDROLYZATE OF AN ORGANO PHOSPHORUS-SILICON COMPOUND

CROSS REFERENCE TO RELATED APPLICATION

This application is a continuation-in-part of Ser. No. 153,464, filed May 27, 1980 which is a continuation-in-part of Ser. No. 59,412 filed July 20, 1979, which is a continuation-in-part of Ser. No. 939,100 filed Sept. 1, 1978 which are all now abandoned.

BACKGROUND OF THE INVENTION

The present invention provides a gellation resistant aqueous glycol or glycol ether composition.

Antifreeze compositions containing glycols and various corrosion inhibitors are well known in the prior art as is illustrated by U.S. Pat. Nos. 3,282,846, dated Nov. 1, 1966, and 3,362,910 dated Jan. 9, 1968. The use of the relatively inexpensive and effective borax and silicates in glycol formulations is well illustrated by these patents. It is conventional in this art to make a glycol concentrate which is then sold to end users for use as a coolant in automotive radiators and the like after dilution with water.

In the past, it has been found that glycol concentrates prepared using conventional corrosion inhibitors such as borax and silicates had a tendency to develop irreversible silicate gels upon standing for a period of time in a warehouse or store. The end user, when he attempted to pour the glycol concentrate into his automotive radiator found that the concentrate had developed "slugs" or gels which either did not pour readily or which tumbled out in discrete masses along with the liquid. The present invention was developed to eliminate this gel formation.

In U.S. Pat. No. 3,312,622 there is disclosed a corrosion resistant glycol composition containing an organo-silicon copolymer having carboxylate salt groups and silicate groups.

In U.S. Pat. No. 4,149,985 dated April 17, 1979, there is disclosed that a gellation resistant glycol composition containing borate and silicate additives can be made wherein the order of addition of the additives and the pH of the solution is closely controlled in order to obtain the gellation resistant formulation.

SUMMARY OF THE INVENTION

It has now been discovered that the shelf life or gellation resistance of single phase aqueous glycol or glycol ether compositions can be improved by the addition to the glycol compositions of an effective amount of the hydrolyzate of organo phosphorous-silicon compounds having the formula $(RO)_3Si(CH_2)_n$—O—P(O)(CH_3)—OR 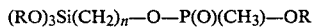

wherein R is an alkyl group of 1-4 carbon atoms, and n is an integer of 1-4,

Examples of compounds within the scope of this formula are methyl 3-(trimethoxysilyl) propyl methylphosphonate, butyl 2-(triethoxysilyl) ethyl methylphosphonate, propyl 3-(tripropoxysilyl) propyl methylphosphonate, and methyl 4-(trimethyoxysilyl) butyl methylphosphonate.

This anti-gellation additive is effective in the presence of the other well-known corrosion inhibitors generally present in such compositions such as alkali metal silicates, borates, mercaptobenzotriazoles, nitrates, nitrites, phosphates, benzoates and the like.

The present invention is a aqueous composition comprising
85 to 98 percent by weight of an alkylene glycol, an alkylene glycol ether, or mixtures thereof,
an effective amount of an alkali metal silicate, an effective amount of the hydrolyzate of organophosphorous-silicon compounds having the formula $(RO)_3Si(CH_2)_n$—O—P(O)(CH_3)—OR 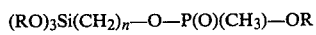

wherein R is an alkyl group of 1-4 carbon atoms,
and n is an integer of 1-4, and the remainder being water and an effective amount of one or more corrosion inhibitors.

DETAILED DESCRIPTION OF THE INVENTION

The glycols and glycol ethers which can be used in the present composition are (1) glycols such as ethylene glycol, diethylene glycol, propylene glycol, dipropylene glycol, (2) glycol monoethers such as the methyl, ethyl, propyl and butyl ether of ethylene glycol, diethylene glycol, propylene glycol and dipropylene glycol, and (3) glycol diethers such as the methyl and ethyl diethers of ethylene glycol, diethylene glycol, and dipropylene glycol.

Ethylene glycol and the monomethyl ether of propylene glycol, i.e., methoxypropanol are particularly preferred.

The following are examples of known corrosion inhibitors and additives which can be used in the present invention.

Alkali metal silicates such as sodium metasilicate, potassium metasilicate, lithium metasilicate, and the like.

Alkali metal borates such as sodium tetraborate, potassium tetraborate, sodium metaborate, and potassium metaborate.

Alkali metal mercaptobenzothiazoles, and alkali metal tolyltriazoles.

Alkali metal nitrates such as sodium nitrate, potassium nitrate, and alkali metal nitrites such as potassium and sodium nitrite.

Alkali metal phosphates such as sodium phosphate and potassium phosphate, alkali metal benzoates, and various dyes.

In the process of making the compositions of this invention, one or more of the above glycols are mixed with one of the above non-silicate corrosion inhibitors and sufficient amounts of mercaptobenzothiazoles, tolyltriazoles, nitrates, and phosphate inhibitors necessary for corrosion protection. An effective amount of the above hydrolyzate is added next. The pH of the solution is then adjusted to the desired pH range of 7-12, and preferably 9-11.0, by adding a basic inorganic compound in aqueous solution such as an alkali metal hydroxide, carbonate, or phosphate. One of the above alkali metal silicates is then added to produce a corrosion and gellation resistant glycol composition.

For the purposes of this invention, an effective amount of the hydrolyzate which will give a gellation resistant glycol composition is an amount ranging from about 0.001 to about 0.5 percent by weight, preferably in the range from 0.005 to 0.1 percent by weight and most preferably in the range from 0.01 to 0.05 percent by weight.

The use of the above corrosion inhibitors when used in a corrosion inhibiting amount is well known in the prior art. Of course, this amount will vary for each inhibitor but in general the amounts used for the silicates and borates are:

0.025 to 1.0 percent by weight based on the total solution weight of silicates and 0.5 to 2.0 percent by weight of borates. Preferably, these ranges are 0.05 to 0.50 percent for the silicates and 0.7 to 1.6 percent for the borates.

In this invention, it has been found that when the borate levels are at the higher end of the desired range (0.5 to 2.0 percent by weight), the amount of silicate that can be added must be in the lower end of the desired range of silicate level (0.025 to 0.3 percent by weight). It is not possible to set forth exactly the amount of silicate to be used in each instance due to the complicating influence of the other corrosion inhibitors such as the aforementioned triazoles, nitrates, nitrites, and phosphates. However, one can by a simple accelerated aging test determine the amount of silicate which when added will give the desired gellation resistance.

An accelerated aging test was used in the examples and controls that follow to estimate the shelf life of the compositions. It was performed by placing a sample of the glycol composition in an oven controlled at 150° F. (66° C.) and measuring the number of hours or days before the composition begins to gel. By comparing the room temperature (25° C.) aging of the same samples, it has been found that one day at 150° F. (66° C.) is approximately equal to one month at room temperature (77° F. or 25° C.).

The invention is further illustrated but not limited by the following examples and controls:

PREPARATION 1

Compounds of the formula,

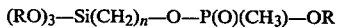

$(RO)_3-Si(CH_2)_n-O-P(O)(CH_3)-OR$ where R is methyl and n is 3 were prepared as set forth in U.S. Pat. No. 4,093,641. This compound is methyl 3-(trimethoxysilyl)-propyl methylphosphonate. After hydrolysis of this product with aqueous sodium hydroxide, the corresponding hydrolyzate is prepared in aqueous solution.

Control 1

Sodium metaborate $Na_2B_4O_7.5H_2O$ (13.0 g) was added to 960 g of ethylene glycol and stirred until dissolution was complete. A 33⅓% aqueous $NaNO_3$ solution (6.0 g) was added and stirred until well dispersed, followed by 2 gms of a 50% aqueous solution of sodium tolyltriazole. The pH of the solution was then adjusted with aqueous caustic to 8.45 and 10 gms of a 10% aqueous solution of sodium metasilicate pentahydrate ($Na_2SiO_3.5H_2O$) was added with stirring during a 2 minute addition time. The final pH of the antifreeze solution was 10.0 and it contained 1.3% sodium metaborate pentahydrate and 0.1% sodium metasilicate pentahydrate. The solution prepared in this manner was found to have a shelf life as determined by the above accelerated aging test of about 7-10 days which is equivalent to about 7-10 months.

EXAMPLE 1

The procedure described in Control 1 was repeated except that just before the pH of the solution was adjusted to 8.45, 0.27 grams of a 37% aqueous solution of the hydrolyzate of preparation 1 was added to give a glycol solution containing 0.01 percent by weight of the hydrolyzate.

The solution was found to have a shelf life of 240 days by the above aging test which is equivalent to about 240 months.

In order to compare the corrosion properties of the above formulations, the following tests were run and reported in Table I.

The corrosion test data was obtained by the use of ASTM D1384-70, Corrosion Test for Engine Coolants in Glassware. In this method, specimens of metals typical of those present in automotive cooling systems are totally immersed in the test antifreeze solution with aeration for 336 hours at 190° F. The corrosion inhibitive properties are evaluated on the basis of the weight changes incurred by the specimens. Each test is run in duplicate and the average weight change is determined for each metal. Acceptable minimum weight losses are those less than 20 milligrams.

TABLE I

| Sample | Test Metal | Duplicate Weight Loss (mg) | Avg. Weight Loss (mg) |
|---|---|---|---|
| Control 1 | copper | 0.5, 2.5 | 2 |
|  | solder | 2.9, 2.8 | 3 |
|  | brass | 4.2, 3.5 | 4 |
|  | steel | 2.0, 1.7 | 2 |
|  | cast iron | 1.5, 0.6 | 1 |
|  | aluminum | 1.2, 1.1 | 1 |
| Example 1 | copper | 2.8, 2.9 | 3 |
|  | solder | 7.4, 7.5 | 7 |
|  | steel | 0.7, 0.4 | 1 |
|  | cast iron | 2.1, 3.8 | 3 |
|  | aluminum | 1.8, +3.0 | +1 |

Substantially, the same results were obtained when the hydrolyzate was added with the sodium silicate solution.

Control 2

The procedure of Control 1 was repeated except that the pH was first adjusted to 9.5 and then 20 grams of a 10% aqueous solution of sodium metasilicate pentahydrate was added to give a 0.2% solution of the silicate. Because of the higher silicate level, this formulation was found to have an estimated shelf life of only 14 months.

EXAMPLE 2

The procedure of Control 2 was repeated with the addition of 0.01% of the hydrolyzate of preparation 1 as was done in Example 1 to give a solution containing 0.2% sodium silicate and 0.01% of the hydrolyzate. The estimated shelf life of this formulation was increased to 150 months.

Table II shows the corrosion test data obtained for Controls 1 and 2 by the use of ASTM D2570-73, Standard Method for Simulated Service Corrosion Testing of Engine Coolants. In this method, an engine coolant is circulated for 1064 hours at 190° F. at 30 to 35 gal./min. in a flow loop consisting of a metal reservoir, an automotive coolant pump, an automotive radiator, and connecting rubber hoses. Test specimens representative of engine cooling system metals are mounted inside the reservoir, which simulates an engine cylinder block. At the end of the test period, the corrosion inhibiting properties of the coolant are determined by measuring the weight losses of the test specimens and by visual examination of the interior surfaces of the components.

TABLE II

| Sample | Metal | Average Weight loss (mg) |
|---|---|---|
| Control 1* | copper | 2 |
| | solder** | 68 |
| | brass | 1 |
| | steel | +2 |
| | cast iron | +2 |
| | aluminum** | 65 |
| Control 2 | copper | 2 |
| | solder** | 18 |
| | brass | 3 |
| | steel | 11 |
| | cast iron | 2 |
| | aluminum** | +3 |

Acceptable minimum weight loss is less than 20 mg (except for solder and aluminum).
*Average of two test runs.
**Acceptable minimum weight loss is less than 60 mg.

The corrosion test data of Table II shows the improvement in corrosion inhibiting properties when the amount of Na$_2$SiO$_3$.5H$_2$O in Control 1 is increased to 0.2%. However, in order to prevent gellation on aging at the 0.2% silicate level the hydrolyzate must be used as a stabilizer as shown in Example 2.

EXAMPLE 3

The procedure described in Control 1 was repeated except that enough of a 37% aqueous solution of the hydrolyzate of preparation 1 was added to give a glycol solution containing 25 ppm or 0.0025 weight percent of the hydrolyzate.

The solution was found to have a shelf life of greater than 50 days by the above aging test which is equivalent to about 50 months.

EXAMPLE 4

The procedure described in Control 1 was repeated except that enough of a 37% aqueous solution of the hydrolyzate of preparation 1 was added to give a glycol solution containing 5000 ppm or 0.5 weight percent of the hydrolyzate.

The solution was found to have a shelf life of greater than 70 days by the above aging test which is equivalent to about 70 months.

We claim:

1. A gellation resistant aqueous glycol composition comprising
   (A) 85 to 98 percent by weight of an alkylene glycol, an alkylene glycol ether, or mixtures thereof,
   (B) an effective amount to reduce corrosion of an alkali metal silicate,
   (C) an effective amount to improve gellation resistance of the hydrolyzate of organophosphorus-silicon compounds having the formula (RO)$_3$Si(CH$_2$)$_n$—O—P(O)(CH$_3$)—OR wherein r is an alkyl group of 1-4 carbon atoms, and n is an integer of 1-4, and
   (D) the remainder being water, and an effective amount of one or more other corrosion inhibitors.

2. The composition of claim 1 wherein the alkylene glycol is ethylene glycol.

3. The composition of claim 1 wherein the alkylene glycol ether is the monomethyl ether of propylene glycol.

4. The composition of claim 1 wherein R is a methyl group and n is 3.

5. A gellation resistant aqueous glycol composition comprising
   (A) 85 to 98 percent by weight of an alkylene glycol,
   (B) an effective amount to reduce corrosion of an alkali metal borate,
   (C) an effective amount to reduce corrosion of an alkali metal silicate,
   (D) an effective amount to improve gellation resistance of the hydrolyzate of organophosphorous-silicon compounds having the formula (RO)$_3$Si(CH$_2$)$_n$—O—P(O)(CH$_3$)—OR wherein R is an alkyl group of 1-4 carbon atoms, and n is an integer of 1-4, and
   (D) the remainder being water.

6. The composition of claim 1 wherein the alkylene glycol is ethylene glycol.

7. The composition of claim 1 wherein R is a methyl group and n is 3.

8. A corrosion and gellation resistant aqueous glycol composition comprising
   (A) 85 to 98 percent by weight of an alkylene glycol,
   (B) 0.5 to 2.0 percent by weight of an alkali metal borate
   (C) 0.025 to 1.0 percent by weight of of an alkali metal silicate,
   (D) 0.001 to 0.5 percent by weight of the hydrolyzate of organophosphorous-silicon compounds having the formula (RO)$_3$Si(CH$_2$)$_n$—O—P(O)(CH$_3$)—OR wherein R is an alkyl group of 1-4 carbon atoms, and n is an integer of 1-4, and
   (D) the remainder being water.

9. The composition of claim 8 wherein the amount of said hydrolyzate used is 0.005 to 0.1 percent by weight.

10. The composition of claim 8 wherein the amount of said hydrolyzate used is 0.01 to 0.05 percent by weight.

11. The composition of claim 8 wherein R is a methyl group and n is 3.

12. The composition of claim 2 wherein the alkylene glycol is ethylene glycol.

13. A method for making a gellation resistant aqueous glycol composition containing alkali metal silicates, and other corrosion inhibitors which comprises adding to the glycol compositions before or during the addition of the alkali metal silicates an effective amount to improve gellation resistance of the hydrolyzate of organophosphorous-silicon compounds having the formula (RO)$_3$Si(CH$_2$)$_n$—O—P(O)(CH$_3$)—OR wherein R is an alkyl group of 1-4 carbon atoms, and n is an integer of 1-4.

14. The method as set forth in claim 13 wherein R is a methyl group and n is 3.

15. The method as set forth in claim 13 wherein the alkylene glycol is ethylene glycol.

16. The product produced by the method of claim 13.

17. The product produced by the method of claim 14.

18. The product produced by the method of claim 15.